United States Patent [19]

Watanabe

[11] Patent Number: 5,653,850
[45] Date of Patent: Aug. 5, 1997

[54] DEVICE FOR PEELING OFF EDGE PORTION OF SHEET PROVIDED WITH RELEASED PAPER

[75] Inventor: Kenji Watanabe, Tokyo, Japan

[73] Assignees: King Jim Co., Ltd.; Seiko Epson Corporation, both of Japan

[21] Appl. No.: 521,989

[22] Filed: Aug. 31, 1995

[30] Foreign Application Priority Data

Sep. 6, 1994 [JP] Japan .................. 59-212380

[51] Int. Cl.$^6$ .................................. B32B 35/00
[52] U.S. Cl. ................. 156/584; 156/344; 271/280; 271/281
[58] Field of Search ............... 156/94, 344, 584; 271/280, 281, 285

[56] References Cited

U.S. PATENT DOCUMENTS

| | | | |
|---|---|---|---|
| 3,537,703 | 11/1970 | Blow, Jr. | 271/281 |
| 3,684,278 | 8/1972 | Takahaski | 271/281 |
| 4,452,664 | 6/1984 | Grey, Jr. et al. | 156/344 X |
| 4,940,506 | 7/1990 | Krause | 156/584 |
| 5,554,253 | 9/1996 | Watanabe | 156/584 X |

FOREIGN PATENT DOCUMENTS

| | | |
|---|---|---|
| 5065257 | 3/1992 | European Pat. Off. . |
| 526213 | 7/1992 | European Pat. Off. . |
| U8802946 | 4/1988 | Germany . |
| 4294734 | 10/1992 | Japan . |
| 539165 | 2/1993 | Japan . |
| 585664 | 4/1993 | Japan . |
| 1098039 | 5/1965 | United Kingdom . |
| 200802 | 8/1978 | United Kingdom . |

*Primary Examiner*—Mark A. Osele
*Attorney, Agent, or Firm*—Lorusso & Loud

[57] ABSTRACT

A device for peeling off an edge portion of a sheet which has an adhesive paper layer and a release paper layer. This device is provided with a casing, a guide portion for guiding the insertion of the sheet, two eccentric rollers provided in the casing in such a manner as to face to each other, a drive motor for rotating the eccentric rollers in the same direction, a control portion for controlling the drive motor, and a limit switch, connected to the control portion, for imposing a limitation on a position into which the sheet is inserted. The sheet is inserted into a space between the eccentric rollers by being guided by the guide portion. When the limit switch detects the sheet, the rollers are driven by the drive motor so as to make the adhesive paper layer and the release paper layer slide in opposite directions, respectively. Consequently, the release paper layer can be easily peeled away from the adhesive paper layer.

4 Claims, 7 Drawing Sheets

DEVICE FOR PEELING OFF EDGE PORTION OF SHEET PROVIDED WITH RELEASED PAPER

BACKGROUND OF THE INVENTION

1. Field of the Invention

The present invention relates to a device (hereunder sometimes referred to simply as an edge peeling device) for peeling off an edge portion of a sheet provided with release paper, which is formed like an elongated or wide tape, so as to facilitate peeling off the entire release paper.

2. Description of the Related Art

Generally, as a means for peeling off an edge portion of a sheet with release paper, there has been known a "method for peeling off release paper" described in the Japanese Patent Public Disclosure (Kokai) No. 4-294734/1992. This method for peeling off release paper will be described hereinbelow with reference to FIG. 13.

In this figure, reference numeral 1 designates a sheet with release paper; and 2 what is called a lettering pen. Further, an elongated hole 3, into which the sheet provided with release paper is inserted, is formed in the lettering pen 2.

When peeling the release paper away from the sheet 1 provided with the release paper, the sheet 1 provided with the release paper 1 is first inserted into the elongated hole 3 formed in the lettering pen 2.

Subsequently, the sheet 1 provided with the release paper is pulled out of the elongated hole 3 by rotating the lettering pen 2 by 180 degrees.

The aforementioned conventional means for peeling off an edge portion of a sheet provided with release paper, however, has a drawback in that the peeling-off of release paper from the sheet provided with the release paper is very troublesome because the operations of inserting the sheet 1 provided with the release paper into the elongated hole 3, of rotating the lettering pen 2 by 180 degrees by holding the inserted sheet 1 provided with the release paper, and of pulling out the sheet 1 provided with the release paper by one of operator's hands while holding the lettering pen 2 by the other hand are manually performed.

The objective of the present invention is to eliminate the aforementioned drawback of the conventional device.

SUMMARY OF THE INVENTION

Accordingly, an object of the present invention is to provide a device for easily peeling off an edge portion of a sheet provided with release paper.

To achieve the foregoing object, in accordance with an aspect of the present invention, there is provided a first edge peeling device for peeling off an edge portion of a sheet provided with release paper. Incidentally, this sheet has an adhesive paper layer, onto one surface of which an adhesive is applied, and a release paper layer covering the adhesive. This edge peeling device comprises: a guide portion for guiding the insertion of the sheet provided with release paper; two eccentric rollers placed at positions in such a manner as to face to each other and sandwich the sheet provided with the release paper, which is guided by this guide portion and extends in the device; and a drive system for rotating the eccentric rollers in a same direction. Further, the sheet provided with the release paper is guided by the guide portion and is inserted into a space between the eccentric rollers. Moreover, the outer circumferential surfaces of the eccentric rollers are brought into abutting engagement with the front and back surface layers, namely, the adhesive paper layer and the release paper layer of the sheet and further, the adhesive paper layer and the release paper layer of the sheet are made to slide in opposite directions, respectively, by rotating the eccentric rollers by use of the drive system. Thereby, the release paper (layer) is peeled away from the adhesive paper (layer).

Thus, in the case of this first edge peeling device, when the sheet provided with release paper is inserted into a space between the two eccentric rollers, guided by the guide portion, and the eccentric rollers are rotated by the drive system in the same direction, the outer circumferential surfaces of the eccentric rollers come close to each other and are brought into abutting engagement with the front and back surfaces of the sheet, respectively. Further, the eccentric rollers cause the adhesive paper (layer) and the release paper (layer) to slide in opposite directions, respectively. Thereby, the release paper (layer) is peeled away from the adhesive paper (layer) at an edge portion of the sheet. Consequently, the release paper (layer) can be easily peeled away from the entire sheet.

Further, in accordance with another aspect of the present invention, there is provided a second embodiment of an edge peeling device for peeling off an edge portion of a sheet provided with a release paper. The sheet has an adhesive paper layer, onto one surface of which an adhesive is applied, and a release paper layer covering the adhesive. This edge peeling device comprises: a guide portion for guiding the insertion of the sheet provided with release paper; a supporting plate, placed on a side of the sheet extending in the device, guided by the guide portion, for supporting a side surface of the sheet; an eccentric roller placed on the other side of the sheet in such a manner that the supporting plate and the eccentric roller sandwich the sheet; and a drive system for rotating the eccentric roller. Further, the sheet provided with the release paper is guided by the guide portion and is inserted into a space between the supporting plate and the eccentric roller. Moreover, the outer circumferential surface of the eccentric roller is brought into abutting engagement with one of the side surface layers, namely, one of the adhesive paper layer and the release paper layer of the sheet and further, the adhesive paper layer and the release paper layer of the sheet are made to slide in opposite directions, respectively, by rotating the eccentric roller by use of the drive system when the sheet is supported by the supporting plate. Thereby, the release paper (layer) is peeled off from the adhesive paper (layer).

Thus, in the case of the second embodiment of the edge peeling device, when the sheet provided with release paper is inserted into a space between the supporting plate and the eccentric roller, guided by the guide portion, and moreover, the eccentric roller is rotated by the drive system, the outer circumferential surface of the eccentric roller comes close to and is brought into abutting engagement with the side surface of the sheet, which is supported by the supporting plate. Further, the eccentric roller causes the adhesive paper (layer) and the release paper (layer) to slide in opposite directions, respectively. Thereby, the release paper (layer) is peeled away from the adhesive paper (layer) at an edge portion of the sheet. Consequently, the release paper (layer) can be easily peeled away from the entire sheet.

Moreover, in the case of a third embodiment, the drive system consists of a driven gear attached to each eccentric roller, a driving gear meshing with each driven gear, and a drive unit for driving this driving gear.

Thus, in the case of the third embodiment of the edge peeling device, each driven gear meshing with the driving gear is rotated in the same direction by the driving gear driven by the drive unit. Thereby, each eccentric roller rotates in the same direction. Consequently, the third embodiment of the edge peeling device can obtain effects and advantages similar to those of the first embodiment of the edge peeling device.

Furthermore, in the case of a fourth embodiment of the edge peeling device, the drive unit consists of a drive motor connected to the driving gear, a limit switch for limiting the extent to which the sheet provided with release paper may be inserted, and a control portion for driving the drive motor according to a signal sent from the limit switch.

Thus, in the case of the fourth edge peeling device, if the sheet touches the limit switch while the sheet is being inserted, the control portion activates and causes the drive motor to rotate each eccentric roller. Thereby, each eccentric roller rotates in the same direction. Consequently, the fourth embodiment of the edge peeling device can obtain effects and advantages similar to those of the first embodiment of the edge peeling device.

Furthermore, in the case of a fifth embodiment of the edge peeling device, the drive unit is constituted by a handle portion which is connected to the driving gear and is used for manually rotating this driving gear.

Thus, in the case of the fifth embodiment of the edge peeling device, the release paper (layer) is peeled away from the adhesive paper (layer) at the edge portion of the sheet by turning the handle portion by hand after the sheet provided with the release paper (layer) is inserted into a space between the eccentric rollers.

Additionally, in accordance with still another (sixth) embodiment of the present invention, there is provided an edge peeling device for peeling off an edge portion of a sheet provided with release paper. The sheet has an adhesive paper layer, onto one surface of which an adhesive is applied, and a release paper layer for covering the adhesive. This edge peeling device comprises: a guide portion for guiding the insertion of the sheet provided with the release paper; a slit portion, which is placed on an extension line of the sheet extending in the device, guided by the guide portion, and into which the sheet provided with release paper is loosely inserted by leaving a clearance between the inner surface thereof and the corresponding surface of the sheet; and a drive system for rotating this slit portion. Further, the sheet provided with the release paper is guided by the guide portion and is inserted into the slit portion. Subsequently, the slit portion is turned by the drive system. Thereafter, the sheet provided with release paper is pulled out of the guide portion. Thereby, the release paper (layer) is peeled away from the adhesive paper (layer).

Thus, in the case of the sixth embodiment, when the sheet provided with the release paper (layer) is guided by the guide portion and is inserted into the slit portion and further the slit portion is turned by the drive system, the edge part of the inserted sheet is bent, so that a difference between the outer and inner radii of the bent part of the sheet is created. When the sheet is in such a state, the sheet is pulled out of the device and is further drawn through an operator's hands. Thus the release paper (layer) is peeled away from the adhesive paper (layer). Consequently, the operator can peel the release paper (layer) away from the adhesive paper (layer) by performing only the simple operation of inserting the sheet into the device and thereafter pulling the sheet therefrom.

Further, in the case of a seventh embodiment of the edge peeling device, the drive unit consists of a drive motor connected to the driving gear, a limit switch for limiting the position into which the sheet provided with release paper may be inserted, and a control portion for driving the drive motor according to a signal sent from the limit switch.

Thus, in the case of the seventh embodiment, if the sheet touches the limit switch while the sheet is being inserted, the control portion activates and causes the drive motor to rotate the slit portion roller. Subsequently, the sheet is pulled out of the device. Thereby, the release paper (layer) is peeled away from the adhesive paper (layer).

Furthermore, in the case of another (eighth) embodiment of the edge peeling device, the drive unit is a handle portion which is connected to the slit portion and is used for manually rotating this slit portion.

Thus, in the case of the eighth embodiment of the edge peeling device, the release paper (layer) is peeled away from the adhesive paper (layer) by manually turning the handle portion after the sheet provided with the release paper (layer) is inserted into the slit portion.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

First Embodiment

Figure 1:
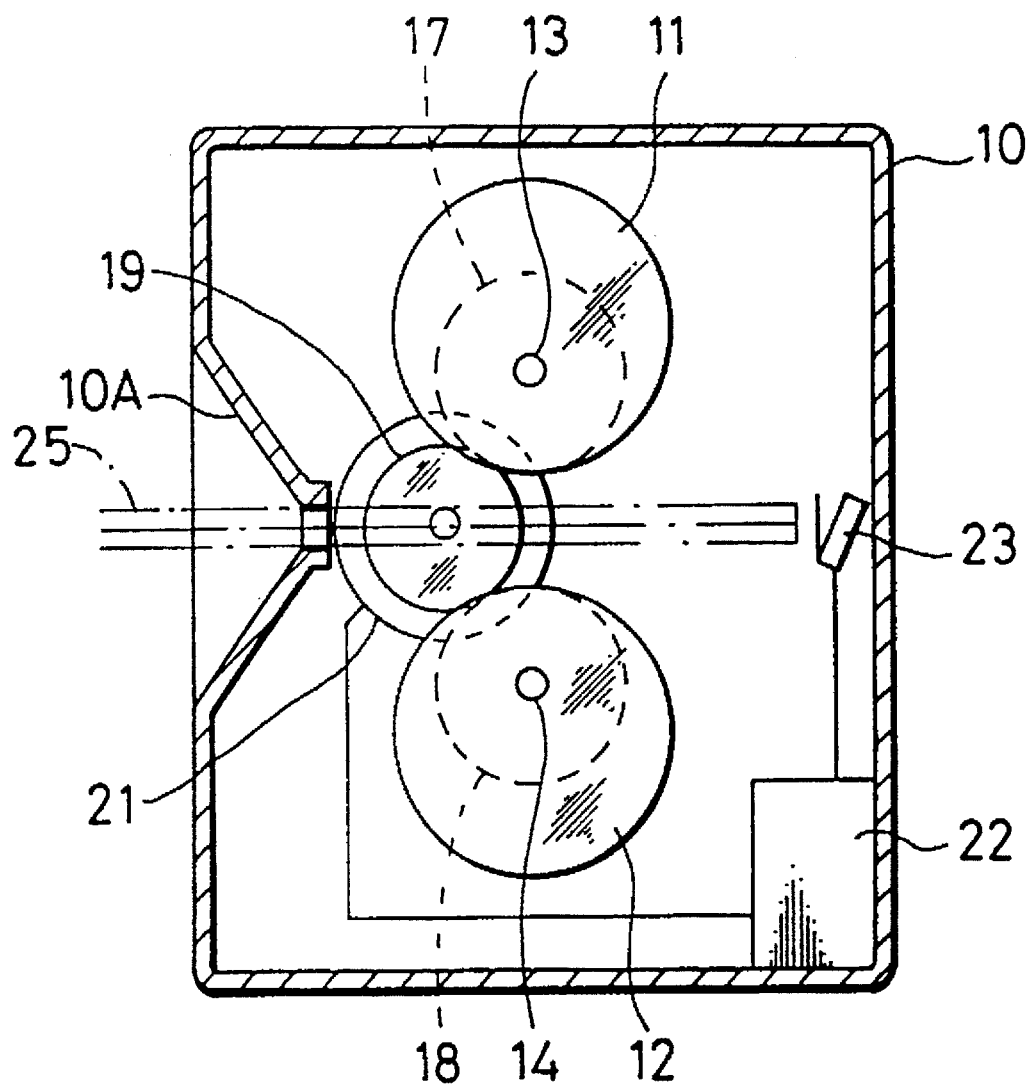
FIG. 1 is a sectional plan view of an edge peeling device embodying the present invention, namely, a first embodiment of the present invention.
Figure 2:
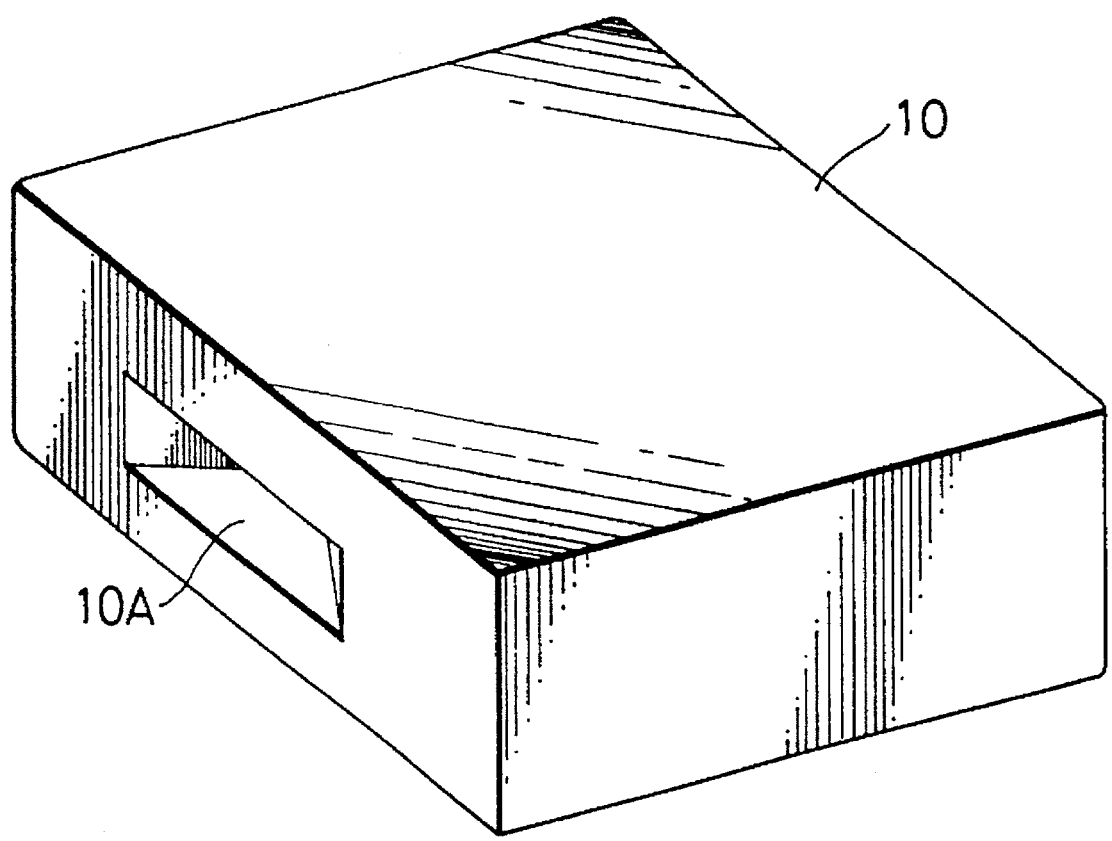
FIG. 2 is a perspective view of the edge peeling device, namely, the first embodiment of the present invention.

The edge peeling device of this first embodiment will be described with reference to FIGS. 1 and 2.

In these figures, reference numeral 10 designates a casing of the edge peeling device. A guide portion 10A for guiding tape 25 (to be described later) and inserting this tape into the case is provided on one side of this case 10 (the left-side as viewed in FIG. 1). In the case 10, two eccentric rollers 11 and 12 are positioned facing each other and sandwich the tape 25 which is guided therein by the guide portion 10. The rotatable shafts 13 and 14 of the eccentric rollers 11 and 12 are provided in parallel with each other. Further, the outer circumferential surfaces of the eccentric rollers 11 and 12 are adapted to come close to each other while maintaining the parallelism therebetween. The amount of eccentricity of each of the eccentric rollers 11 and 12 and the placement of the rotating shafts thereof are set in such a manner that the gap between the outer circumferential surfaces of the rollers 11 and 12 becomes smaller than the thickness of the tape 25, or the rollers 11 and 12 are brought into completely abutting engagement with each other when the rollers 11 and 12 come closest to each other. To cause large frictional resistance between the outer circumferential surface of each of the rollers and the corresponding front or back surface of the tape 25, rubber rollers or rollers having an outer circumferential surface to which an adhesive is applied, are used as the eccentric rollers 11 and 12.

Further, driven gears 17 and 18 are respectively mounted on the rotating shafts 13 and 14 of the eccentric rollers 11 and 12. A driving gear 19, which meshes with the driven gears 17 and 18 and causes these driven gears to rotate in the same direction, is provided therebetween. This driving gear 19 is connected to a drive motor 21. Further, the drive motor 21 is connected to a controller 22 for controlling this drive motor 21. Moreover, a limit switch 23 which limits the length of the tape 25 inserted is connected to the controller 22. This limit switch 23 is provided in the case 10, at the right-side as viewed in FIG. 1, in line with the inserted tape 25.

The controller 22 controls the following sequence of operations. Namely, in response to a signal indicating that the tape 25 is in abutting engagement with the limit switch, the drive motor 21 is activated so as to rotate each of the eccentric rollers 11 and 12 through a set or predetermined angle. Thereafter, the rollers 11 and 12 are returned to their original positions. Here, the set angle is an angle of rotation of each of the eccentric rollers 11 and 12, which are respectively rotated in opposite directions, which is only a little beyond the position where the outer circumferential surfaces of the rollers 11 and 12 come closest to each other. Thereby, the eccentric rollers 11 and 12 securely sandwich the tape 25 when the eccentric rollers 11 and 12 are in the position where the tape 25 the outer circumferential surfaces of the rollers 11 and 12 come closest to each other. Further, the eccentric rollers 11 and 12 are rotated a little beyond such a position. This causes a slippage between the front and back surface layers of the tape 25. The set angle may be determined in such a manner that each of the eccentric rollers 11 and 12 is rotated a complete turn and returns to its original position thereof.

In the aforementioned embodiment, the drive unit is composed of the drive motor 21, the controller 22 and the limit switch 23. The drive system is composed of this drive unit, the driven gears 17 and 18 and the driving gear 19.

Figure 3:
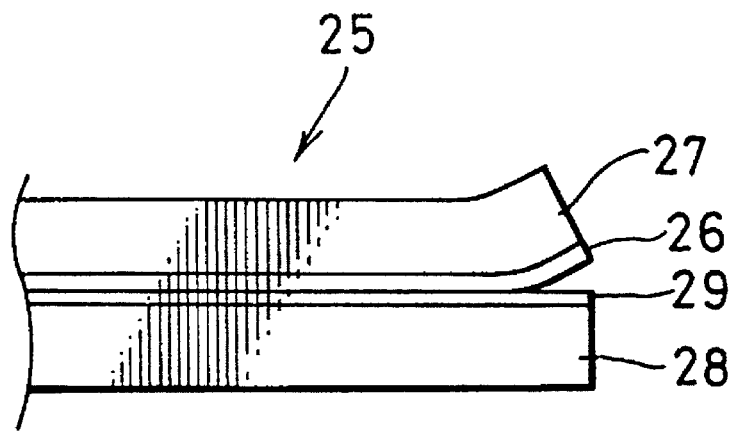
FIG. 3 is a sectional diagram illustrating the configuration of tape.

In this embodiment, printing tape 25 is used as a sheet with release paper. As illustrated in FIG. 3, this tape 25 consists of: adhesive sheet or paper 27, on one face of which a pressure-sensitive adhesive 26 is applied; release paper 28 covering the adhesive 26 of this adhesive sheet or paper 27; and a silicone layer 29 for facilitating the peeling of this release paper 28 from the adhesive 26. Furthermore, polyester, paper or the like may be used as the material of the adhesive sheet 27. Additionally, polyester, polypropylene or the like may be used as the material of the release paper 28.

Next, the process of peeling off an edge portion of the tape 25 by use of the edge peeling device having the aforementioned configuration will be described hereinbelow.

Figure 4:
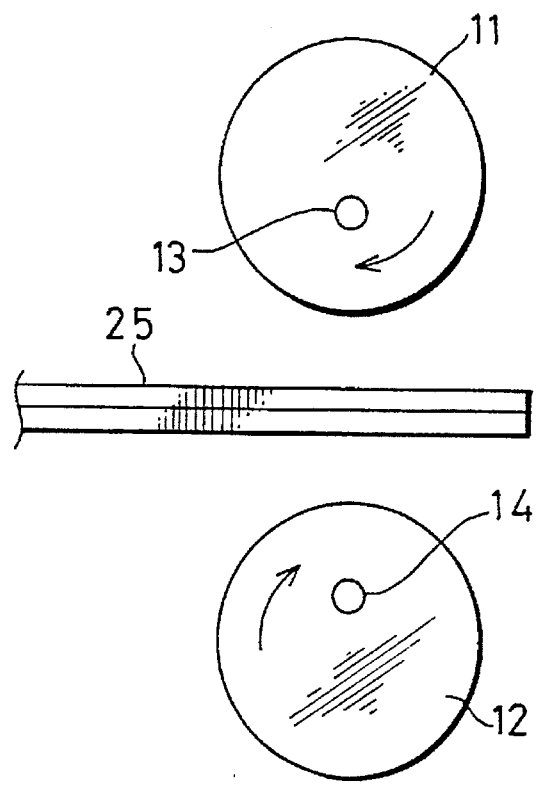
FIGS. 4 and 5 are schematic diagrams illustrating operation of the edge peeling device, namely, the first embodiment of the present invention.
Figure 5:
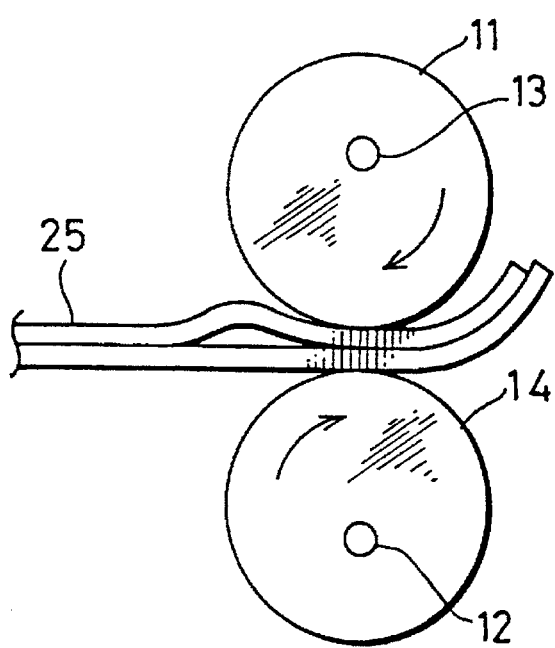

First, the tape 25, the edge portion of which should be peeled off, is inserted from the guide portion 10A into the case 10 until the end of the tape 25 touches the inner wall of the case 10. When the end of the tape 25 touches the inner wall in the case 10, the limit switch 23 is turned on. Thereby, the controller 22 activates and causes the drive motor 21 to rotate each of the eccentric rollers 11 and 12 through the predetermined set angle. Thus, the tape 25, initially as shown in FIG. 4, is sandwiched by the eccentric rollers 11 and 12 and slippage between the front and back surface layers of the tape 25 is caused as illustrated in FIG. 5. Namely, the adhesive sheet 27 slips relative to the release paper 28 of the tape 25. As a result, an edge portion of the release paper 28 is peeled away from the adhesive sheet 27. Thereafter, each of the eccentric rollers 11 and 12 is turned or returned to the original position. Then, the tape 25 is pulled out of the case 10. Subsequently, the peeled edge portion of the release paper 28 is taken by hand. Finally, the entire release paper 28 is peeled away from the adhesive sheet.

As described above, an edge portion of the release paper 28 can be easily peeled away from the edge portion of the tape 25 merely by inserting the tape 25 through the guide portion 10A and thereafter pulling the tape 25 out of the case 10. Consequently, the release paper 28 can be easily peeled away from the adhesive sheet 27.

Second Embodiment

Figure 6:
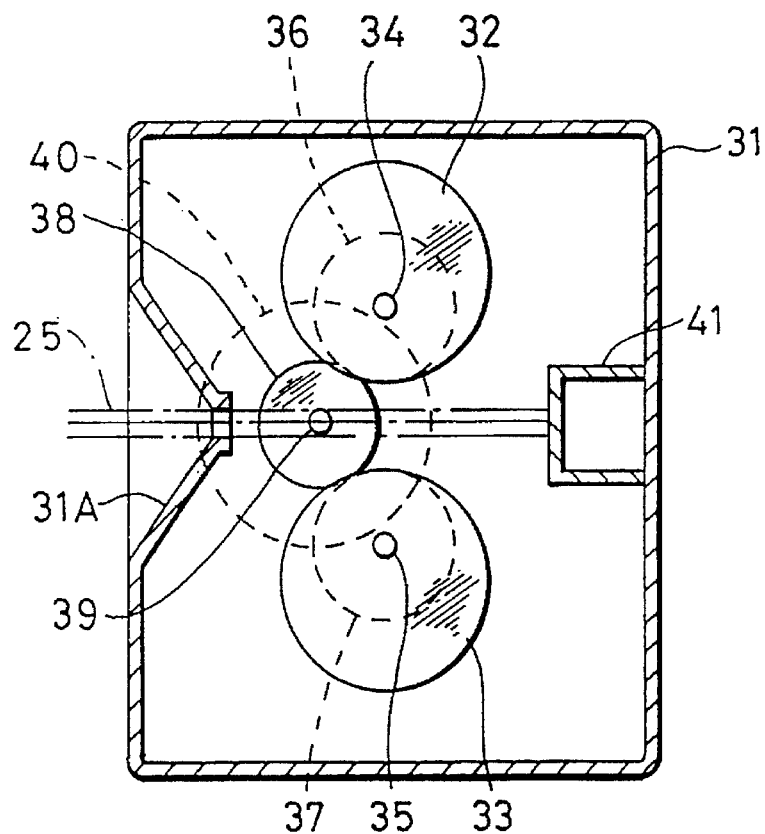
FIG. 6 is a sectional plan view of another edge peeling device embodying the present invention, namely, a second embodiment of the present invention.
Figure 7:
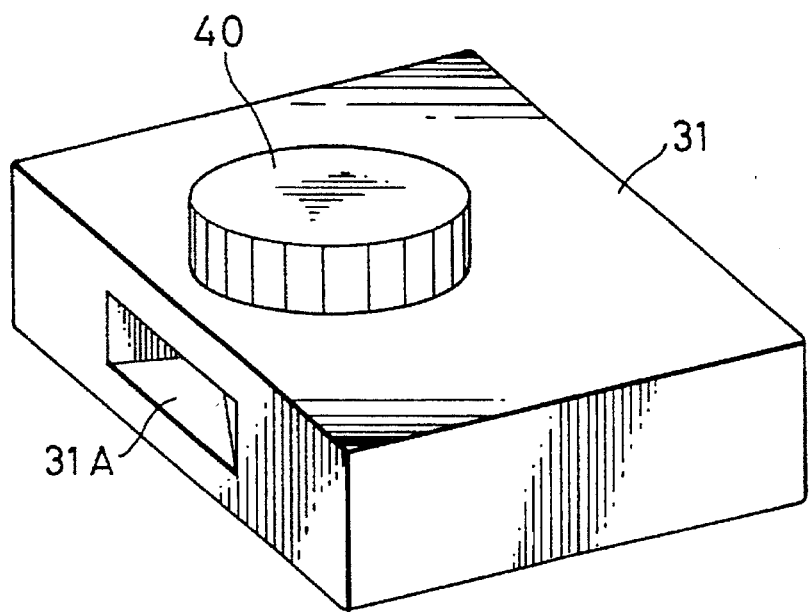
FIG. 7 is a perspective view of the edge peeling device, namely, the second embodiment of the present invention.

Next, a second embodiment of the present invention will be described hereinbelow. The edge peeling device of this embodiment is a device used for manually performing a peeling operation. FIGS. 6 and 7 illustrate the practical configuration of this embodiment.

In these figures, reference numeral 31 designates a case of this edge peeling device. A guide portion 31A is provided on a side of this case 31. Further, two eccentric rollers 32 and 33 are provided in the case 31. The eccentric rollers 32 and 33, rotatable shafts 34 and 35 thereof and driven gears 36 and 37 respectively mounted on the rotatable shafts 34 and 35 and a driving gear 38 are similar to the corresponding elements or parts of the aforesaid first embodiment.

A rotatable shaft 39 of the driving gear 38 is extended out of the case 31. Further, a knob 40, serving as a handle for manually turning the driving gear 38, is attached to this extended portion of the shaft 39. Moreover, a stopper 41 for limiting the length of the tape 25 inserted is provided on the other inner side surface of the case 31.

In the case where the release paper 28 of the tape 25 is peeled away from the adhesive sheet or paper 27 thereof, the tape 25 is first inserted from the guide portion 31A to a limit position in the case 31. Subsequently, an operator turns the knob 40 by hand. Thereby, the eccentric rollers 32 and 33 act in a manner similar to the eccentric rollers of the first embodiment. Consequently, the release paper 28 of the tape 25 is peeled away from the adhesive sheet 27.

Thus, in the case of using the device of this embodiment, the release paper 28 can be easily peeled away from an edge portion of the tape 25.

Third Embodiment

Figure 8:
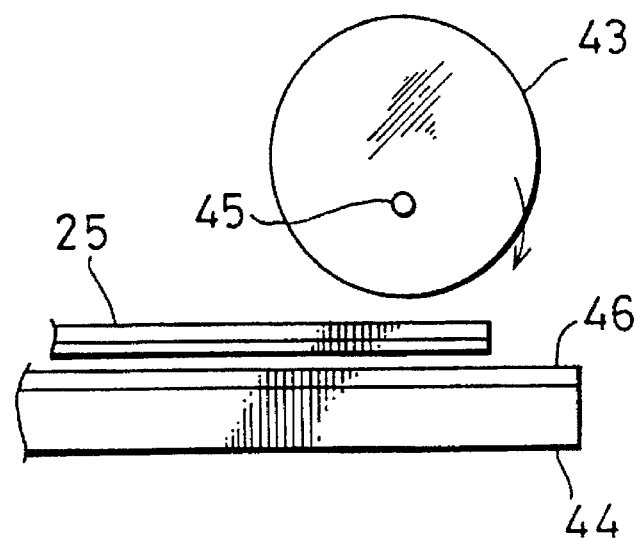
FIG. 8 is a sectional plan view of another edge peeling device embodying the present invention, namely, a third embodiment of the present invention.

An edge peeling device according to this embodiment will be described hereinbelow with reference to FIG. 8. The configuration of the entire edge peeling device is similar to that of the first embodiment. Thus, the same reference characters designate members or parts identical to those of the first embodiment. Further, the description of such members is omitted herein.

The case 10 and the guide portion 10A are similar to those of the first embodiment. In this case 10, an eccentric roller 43 and a supporting plate 44 are respectively placed on opposing sides of the tape 25.

The rotatable shaft 45 of the eccentric roller 43 is parallel to the supporting plate 44. The eccentric roller 43 is adapted to come close to the supporting plate 44, while maintaining the parallelism between the outer circumferential surface of the eccentric roller 43 and the surface of the supporting plate 44. The amount of eccentricity of the eccentric roller 43 and the placement of the rotatable shaft 43 thereof are set in such a manner that the gap between the outer circumferential surface of the roller 43 and the surface of the supporting plate 44 becomes smaller than the thickness of the tape 25, or the roller 43 is brought into completely abutting engagement with the surface of the supporting plate 45 when the roller 43 and the plate 44 come closest to each other.

Further, in order to cause large frictional resistance between the outer circumferential surface of the roller 43 and a surface of the tape 25, a rubber roller or a roller having an outer circumferential surface to which an adhesive is applied, is used as the eccentric roller 43.

The drive system for rotating the eccentric roller 43 is similar to the drive system of the first or second embodiment.

In the case where the release paper 28 of the tape 25 is peeled away from the adhesive sheet or paper 27 thereof in the edge peeling device having the configuration described hereinabove, the tape 25 is first inserted through the guide portion 31A into the case 31. Subsequently, the eccentric roller 43 is turned by an automatic or manual drive system. When this eccentric roller 43 rotates, the outer circumferential surface of the eccentric roller 43 is brought into abutting engagement with a surface of the tape 25, which is supported by the supporting plate 44 without slip therebetween. Thereby, the adhesive sheet 27 and the release paper 28 are made to slide in opposite directions. Consequently, the release paper 28 of the tape 25 is peeled away from the adhesive sheet 27.

Thus, in the case of using the device of this embodiment, the release paper 28 can be easily peeled away from an edge portion of the tape 25.

Fourth Embodiment

Figure 9:
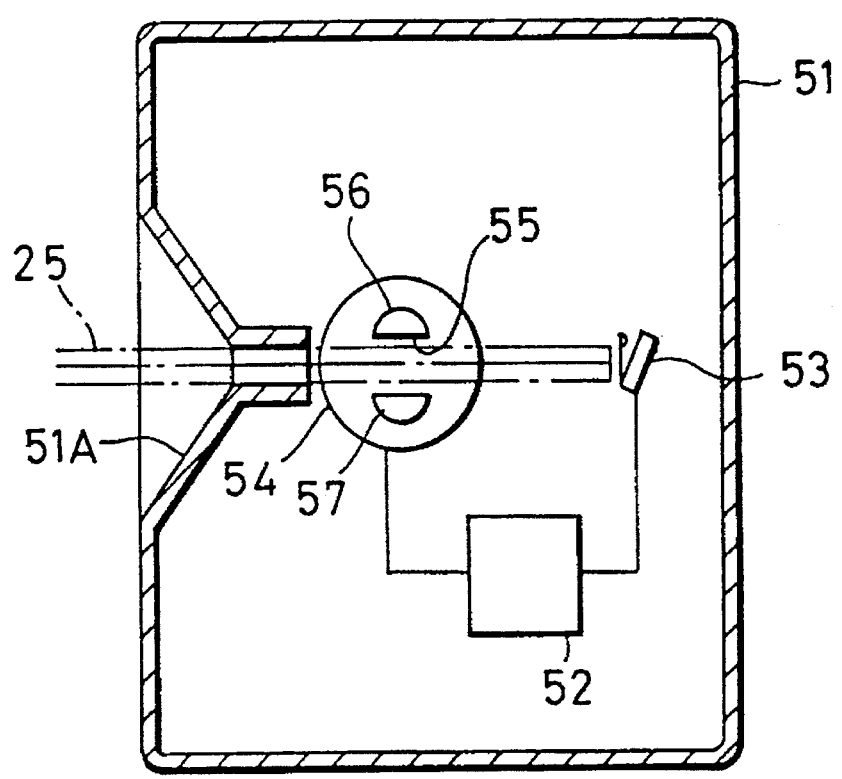
FIG. 9 is a sectional plan view of a further edge peeling device embodying the present invention, namely, a fourth embodiment of the present invention.

An edge peeling device according to this embodiment will be described hereinbelow with reference to FIG. 9. In the case of the edge peeling device of this embodiment, an edge portion of the tape 25 is bent. Further, the release paper 28 of the tape 25 is peeled away from the adhesive sheet 27 thereof by utilizing the difference between the outer and inner radii (namely, the difference in length between the outer and inner circumferences) of the bent part of the tape 25.

A case 51, a guide portion 51A, a controller 52, a limit switch 53 and a drive motor 54 are similar to the corresponding elements or members of the first embodiment. Further, in the case of this embodiment, a slit element 55 is connected to the drive motor 54. This slit element 55 has a slit into which the tape 25 can be loosely inserted, leaving some clearance between each of the inner surfaces of the slit and the corresponding outer surfaces of the tape 25. Practically, the slit element 55 consists of a pair of clipping rods 56 and 57 placed on both sides of the tape 25, respectively, in such a way as to sandwich the tape 25 therebetween, which tape extends through the guide portion 51A into the case 51, and in such a manner that a gap or slit, the width of which is a little wider than the thickness of the tape 25, is provided therebetween. The pair of clipping rods 56 and 57 are connected to the drive motor 54.

Figure 11:
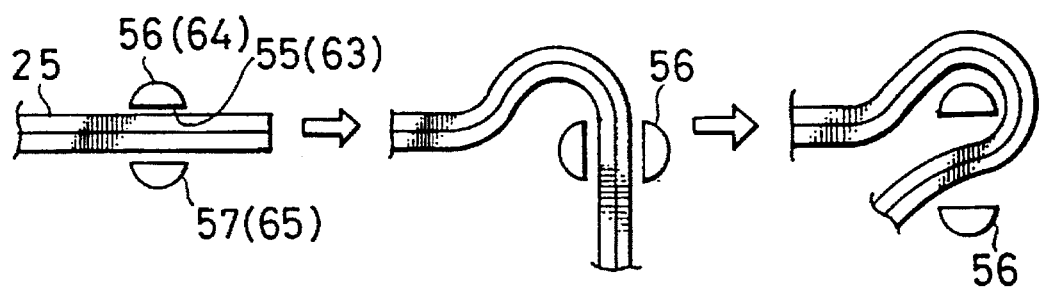
FIGS. 11 and 12 are schematic diagrams for illustrating operation of the edge peeling device of the fifth embodiment of the present invention.
Figure 12:
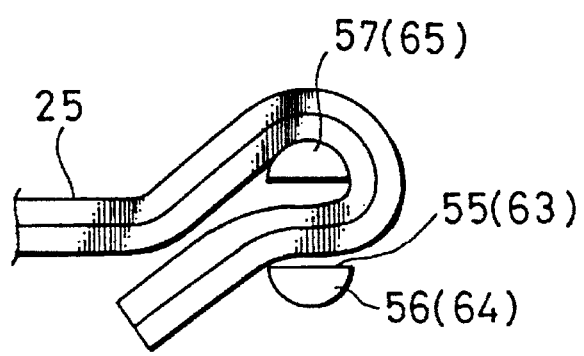
Figure 13A:
FIGS. 13(A) to 13(D) are schematic diagrams illustrating the conventional method for peeling off release paper.
Figure 13B:
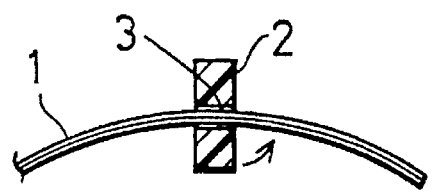
Figure 13C:
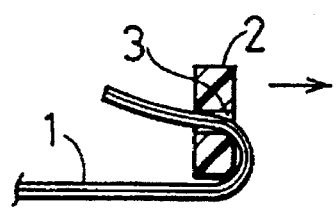
Figure 13D:

In the case of the device having the aforementioned configuration, the tape 25 is first inserted into the case 51 from the guide portion 51A. When the inserted tape 25 engages the limit switch 53, the drive motor 54 is activated by the controller 52 to rotate the slit element 55 from a position where the angle between the inner flat surface of, for example, the rod 57 and the direction, in which the tape 25 is inserted, is 180 degrees as illustrated in FIG. 11, to another position where the slip portion 55 is turned further 180 degrees, namely, the angle therebetween becomes 360 degrees as illustrated in FIG. 12. Thereafter, the tape 25 is pulled out of the case 51 by hand. Then, such a tape 25 is drawn through an operator's hands to peel the release paper 28 of the tape 25 away from the adhesive sheet 27.

As described above, the release paper 28 can be easily peeled away from the edge portion of the tape 25 merely by inserting the tape 25 through the guide portion 51A and thereafter pulling the tape 25 out of the case 51.

Fifth Embodiment

Figure 10:
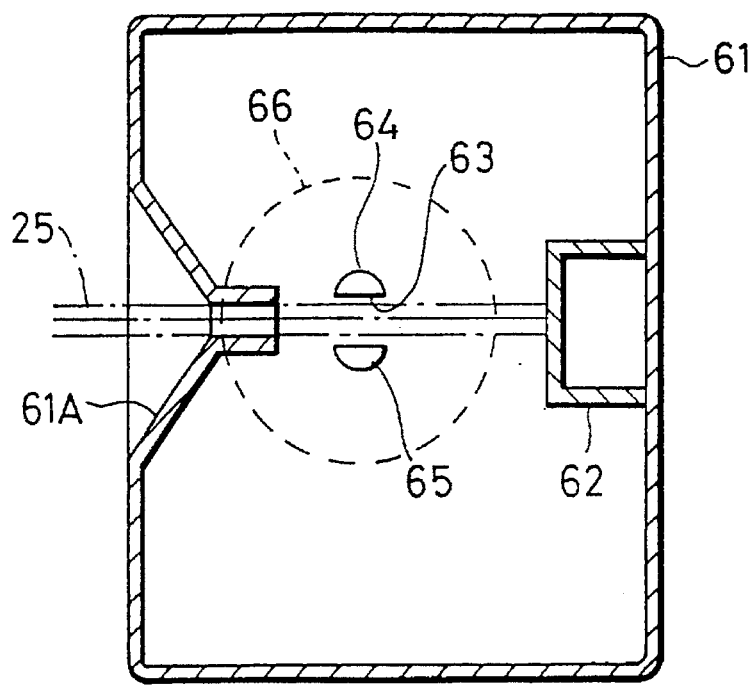
FIG. 10 is a sectional plan view of still another edge peeling device embodying the present invention, namely, a fifth embodiment of the present invention.

An edge peeling device according to this embodiment will be described hereinbelow with reference to FIG. 10. The edge peeling device of this embodiment is obtained by changing the edge peeling device of the aforementioned fourth embodiment into a device of the manually-operated type.

A stopper 62 is provided in addition to the guide portion 61A in case 61. A slit element 63 is provided in alignment with the tape 25 extending into the case 61 guided by the guide portion 61A. This slit element 63 consists of a pair of clipping rods 64 and 65, similar to the slit element 55 of the aforementioned fourth embodiment. The pair of the clipping rods 64 and 65 are connected to a manually-operated knob 66 mounted on the outer surface of the case 61.

In the case of this embodiment having the aforementioned configuration, the tape 25 is first inserted into the slit portion 63 guided by the guide portion 61A. When the inserted tape 25 is put into abutting engagement with the stopper 62 and the knob 66 is turned 180 to 360 degrees, the drive motor 54 is activated by the controller 52 to rotate the slit element 55 from a first position, where the angle between the inner flat surface of, for example, the rod 65 and the direction, in which the tape 25 is inserted, is 180 degrees as illustrated in FIG. 11, to another position where the slip portion 63 is turned further 180 degrees, namely, the angle therebetween becomes 360 degrees as illustrated in FIG. 12. When the slit element 63 is in this state as illustrated in FIG. 12, the tape 25 is pulled out of the case 51 by hand and drawn through an operator's hands.

Examples of Modifications of Embodiments

Incidentally, in the case of each of the aforesaid embodiments, the tape 25 is used as a sheet provided with release paper. However, even in the case of a modification using wider sheet-like tape as the sheet provided with release paper, effects and advantages similar to those of the aforementioned embodiments can be obtained.

Further, in the cases of the aforesaid first and second embodiments, the rotatable shafts 13 and 14 of the eccentric rollers 11 and 12 are parallel with each other. The rotatable shafts, however, may be inclined with respect to each other. In this case, the adhesive sheet 27 and the release paper 28 of the tape 25 are made to slide in opposite directions which are inclined or perpendicular to the longitudinal direction of the tape.

Additionally, in the cases of the aforementioned second and fifth embodiments, the knobs 40 and 66 are used as handles. A crank-like lever, however, may be used instead of the knobs.

As above described in detail, in the cases of the edge peeling devices of the present invention, an edge portion of a sheet provided with release paper is peeled away therefrom merely by inserting the sheet in the device and thereafter pulling the inserted sheet out of the device. Consequently, the release paper can be extremely easily peeled away from the sheet.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An edge peeling device for peeling off an edge portion of a release paper from a multilayer sheet including an adhesive paper layer, having a surface on which an adhesive is applied, and the release paper layer covering the adhesive, the edge peeling device comprising:

a guide portion for guiding insertion of the multilayer sheet into the device;

two eccentric rollers mounted to face to each other and sandwich the sheet provided with the release paper, which is guided by the guide portion and extends into the device; and a drive system for rotating the eccentric rollers in the same direction, whereby the sheet provided with the release paper is guided by the guide portion into a space between the eccentric rollers, whereby the outer circumferential surfaces of the eccentric rollers are brought into abutting engagement with the adhesive paper layer and the release paper layer of the multilayer sheet, respectively whereby, the adhesive paper layer and the release paper layer of the sheet are made to slide in opposite directions, by rotating the eccentric rollers by use of the drive system, whereby the release paper layer is peeled away from the adhesive paper layer.

2. The edge peeling device according to claim 1, wherein the drive system comprises a driven gear attached to each of the eccentric rollers, a driving gear meshing with each of the driven gears, and a drive unit for driving the driving gear.

3. The edge peeling device according to claim 2, wherein said drive unit comprises a drive motor connected to the driving gear, a limit switch for limiting the extent to which the sheet is inserted into the device, and a controller for driving the drive motor according to a signal sent from the limit switch.

4. The edge peeling device according to claim 2, wherein said drive unit is a handle which is connected to the driving gear for manually rotating the driving gear.

* * * * *